US012355357B2

(12) United States Patent
Han et al.

(10) Patent No.: US 12,355,357 B2
(45) Date of Patent: Jul. 8, 2025

(54) MULTI-LEVEL BUCK CONVERTER AND ASSOCIATE CONTROL CIRCUIT THEREOF

(71) Applicant: Monolithic Power Systems, Inc., San Jose, CA (US)

(72) Inventors: Di Han, San Jose, CA (US); Jian Jiang, Los Gatos, CA (US)

(73) Assignee: Monolithic Power Systems, Inc., San Jose, CA (US)

( * ) Notice: Subject to any disclaimer, the term of this patent is extended or adjusted under 35 U.S.C. 154(b) by 338 days.

(21) Appl. No.: 18/162,287

(22) Filed: Jan. 31, 2023

(65) Prior Publication Data

US 2023/0179100 A1    Jun. 8, 2023

Related U.S. Application Data

(62) Division of application No. 17/330,584, filed on May 26, 2021, now abandoned.

(51) Int. Cl.
*H02M 3/158*     (2006.01)
*H02M 3/157*     (2006.01)

(52) U.S. Cl.
CPC ........ *H02M 3/1586* (2021.05); *H02M 3/157* (2013.01)

(58) Field of Classification Search
CPC ............ H02M 3/02; H02M 3/04; H02M 3/06; H02M 3/07–078; H02M 3/10;
(Continued)

(56) References Cited

U.S. PATENT DOCUMENTS 10,020,734 B2    7/2018  Zhong
2009/0237061 A1*  9/2009  Kao ..................... G05F 1/575
                                                323/293

(Continued)

*Primary Examiner* — Thienvu V Tran
*Assistant Examiner* — Carlos O Rivera-Perez
(74) *Attorney, Agent, or Firm* — Perkins Coie LLP

(57) ABSTRACT

A control circuit for controlling a multi-level buck converter having N pairs of switches serially connected between an input terminal and a logic ground, wherein N is an integer equal to or greater than 2. The control circuit has a comparing circuit, a selecting circuit and a delay circuit. The comparing circuit compares a voltage feedback signal indicative of an output voltage signal of the multi-level buck converter with a reference signal to generate a comparing signal. The selecting circuit generates N set signals based on the comparing signal. The delay circuit delays the N set signals to provide N delay set signals to control the N pairs of switches when the output voltage signal falls in $$(1 \pm k\%) \times \frac{1}{N}$$

of an input voltage signal of the multi-level buck converter, $$(1 \pm k\%) \times \frac{2}{N}$$

of the input voltage signal, . . . , or $$(1 \pm k\%) \times \frac{N-1}{N}$$

(Continued)

of the input voltage signal, wherein k is a proportional coefficient.

20 Claims, 11 Drawing Sheets

(58) Field of Classification Search
CPC ...... H02M 3/135; H02M 3/137; H02M 3/139; H02M 3/142; H02M 3/145; H02M 3/155; H02M 3/1555; H02M 3/156; H02M 3/157; H02M 3/158; H02M 3/1582; H02M 3/1586; H02M 3/1588; H02M 1/0003; H02M 1/0025; H02M 1/0043; H02M 1/0067; H02M 1/007; H02M 1/0085; H02M 1/0095; H02M 1/088; H02M 1/36; H02M 1/0016; H02M 1/0019; H02M 1/0022; H02M 1/0038; H02M 7/42; H02M 7/44; H02M 7/48; H02M 7/483; H02M 7/4833; H02M 7/4835; H02M 7/4837; H02M 7/487; H02M 7/49; Y02B 70/10
USPC ........ 323/212–219, 222–226, 268–275, 280, 323/282–285, 351; 363/59, 60, 62, 63, 363/65–72
See application file for complete search history.

(56) References Cited

U.S. PATENT DOCUMENTS

| | | | |
|---|---|---|---|
| 2010/0079123 A1* | 4/2010 | Miyamae | H02M 3/158 323/282 |
| 2020/0161967 A1 | 5/2020 | Chuang et al. | |
| 2021/0028683 A1 | 1/2021 | Jiang et al. | |
| 2021/0159790 A1* | 5/2021 | Tseng | H02M 3/158 |
| 2022/0393594 A1 | 12/2022 | Han et al. | |

* cited by examiner

MULTI-LEVEL BUCK CONVERTER AND ASSOCIATE CONTROL CIRCUIT THEREOF

CROSS-REFERENCE TO RELATED APPLICATION

The present application is a divisional of U.S. patent application Ser. No. 17/330,584, filed on May 26, 2021, which is incorporated herein by reference in its entirety.

TECHNICAL FIELD OF THE INVENTION

The present invention generally relates to electronic circuits, and more particularly but not exclusively, to multi-level buck converters.

BACKGROUND OF THE INVENTION

As compared to a conventional buck (single-phase) converter, a multi-level buck converter has several advantages. For instance, the switching stresses of those switches of multi-level buck converters are lower than those of conventional buck converters. Moreover, the ripple in multi-buck converters could remarkably be reduced as compared to the ripple at the same switching speed for the conventional buck converter.

For example, as shown in FIG. 1, a three-level buck converter comprise a first fly capacitor C1, an inductor LOUT, a capacitor COUT and four switch transistors: switch transistor M1a, switch transistor M1b, switch transistor M2a and switch transistor M2b. Therefore, there are four switching states for the three-level buck converter: 00, 01, 10, and 11. Herein, "1" denotes a high side switch transistor (e.g., M1a or M2a) is on while its corresponding low side switch (e.g., M1b or M2b) transistor is off, and "0" denotes the high side transistor is off while its corresponding low side switch transistor is on. In each of the four switching states, only two of four switch transistors are on.

Therefore, switching state 00 indicates switch transistors M1a and M2a are off while switch transistors M1b and M2b are on such that an inductor current flowing through the inductor LOUT is freewheeling through switch transistors M1b and M2b. In switching state 01, switch transistors M1a and M2b are off while switch transistors M1b and M2a are on such that the first flying capacitor voltage C1 is discharged to drive a switch node voltage signal VSW at one-half of an input voltage signal VIN of the three-level buck converter. In switching state 10, switch transistors M1a and M2b are on while switch transistors M1b and M2a are off such that the first flying capacitor voltage C1 is charged by the input voltage signal VIN to drive the switch node voltage signal VSW at ½ VIN. In switching state 11, switch transistors M1a and M2a are on while switch transistors M1b and M2b are off such that the switch node voltage signal VSW is equal to the input voltage signal VIN. The switching states of the three-level buck converter are summarized in the following Table 1:

TABLE 1

| | States of Switch Transistors | | | |
|---|---|---|---|---|
| States | 00 | 01 | 10 | 11 |
| M1a | Off | Off | On | On |
| M2a | Off | On | Off | On |
| M1b | On | On | Off | Off |
| M2b | On | Off | On | Off |

Furthermore, Table 2 illustrates a potential of the switch node voltage signal VSW, a potential of the first terminal of the first flying capacitor C1+ and a potential of the second terminal of the first flying capacitor C1− for different switching states.

TABLE 2

| Potentials for Different Switching States | | | |
|---|---|---|---|
| States | VSW | C1+ | C1− |
| 00 | 0 V | ½ VIN | 0 V |
| 01 | ½ VIN | ½ VIN | 0 V |
| 10 | ½ VIN | VIN | ½ VIN |
| 11 | VIN | VIN | ½ VIN |

From Table 2, it could be found that the potential of the switch node voltage signal VSW is switched among a potential of a logic ground (labeled as 0V), one-half of a potential of the input voltage signal VIN (labeled as ½ VIN), and the potential of the input voltage signal VIN (labeled as VIN). As compared to a conventional buck converter, the root-mean-square (RMS) of the switch node voltage signal VSW of the three-level buck converter may be reduced by 50%. This reduction of the switch node voltage signal VSW also reduces the switching voltage stresses on the switching transistors. Given the reduced voltage stress, the breakdown voltage ratings for the switching transistors may also be reduced as compared to these of the conventional buck converter. Multi-level buck converters thus offer reduced conduction losses for its switch transistors.

Although the multi-level buck converters offer advantageous properties over conventional buck converters, these advantages come at the cost of increased regulation complexity. Besides increased regulation complexity, the multi-level buck converter creates a number of control stability issues that are not appeared in conventional buck converters, especially when the multi-level buck converter transits from one operation state to another operation state. It is thus conventional to limit multi-level buck converter to work in one of the operation states, which may limit a range of duty cycle which is defined as the ratio of an output voltage signal VOUT to the input voltage signal VIN of the multi-level buck converter. Therefore, it is desired to have an improved control solution for multi-level buck converter with a wide range of duty cycle and good stability.

SUMMARY OF THE INVENTION

An embodiment of the present invention discloses a control circuit for controlling a multi-level buck converter having N pairs of switches serially connected between an input terminal and a logic ground, and wherein N is an integer equal to or greater than 2. The control circuit comprises a comparing circuit, a selecting circuit and a delay circuit. The comparing circuit is configured to receive a reference signal and a voltage feedback signal indicative of an output voltage signal of the multi-level buck converter, and further configured to compare the voltage feedback signal with the reference signal to generate a comparing signal. The selecting circuit is configured to receive the comparing signal, and further configured to generate N set signals based on the comparing signal. The delay circuit is configured to delay the N set signals to provide N delay set signals to control the N pairs of switches when the output voltage signal falls in $$(1 \pm k\%) \times \frac{1}{N}$$

of an input voltage signal of the multi-level buck converter, $$(1 \pm k\%) \times \frac{2}{N}$$

of the input voltage signal, . . . , or $$(1 \pm k\%) \times \frac{N-1}{N}$$

of the input voltage signal, wherein k is a proportional coefficient.

An embodiment of the present invention discloses a multi-level buck converter comprising N pairs of switches, a comparing circuit, a selecting circuit and a delay circuit. The N pairs of switches are serially connected between an input terminal and a logic ground, wherein N is an integer equal to or greater than 2. The comparing circuit is configured to receive a reference signal and a voltage feedback signal indicative of an output voltage signal of the multi-level buck converter, and further configured to compare the voltage feedback signal with the reference signal to generate a comparing signal. The selecting circuit is configured to receive the comparing signal, and further configured to generate N set signals based on the comparing signal. The delay circuit is configured to delay the N set signals to provide N delay set signals to control the N pairs of switches when the output voltage signal falls in $$(1 \pm k\%) \times \frac{1}{N}$$

of an input voltage signal of the multi-level buck converter, $$(1 \pm k\%) \times \frac{2}{N}$$

of the input voltage signal, . . . , or $$(1 \pm k\%) \times \frac{N-1}{N}$$

of the input voltage signal, wherein k is a proportional coefficient.

An embodiment of the present invention discloses a control method for controlling a multi-level buck converter having N pairs of switches serially connected between an input terminal and a logic ground, and wherein N is an integer equal to or greater than 2. The control method comprises the following steps: 1) generating a comparing signal based on a comparison between a reference signal and a voltage feedback signal indicative of an output voltage signal of the multi-level buck converter; 2) generating N set signals based on the comparing signal; and 3) providing N delay set signals to control the N pairs of switches by delaying the N set signals when the output voltage signal falls in $$(1 \pm k\%) \times \frac{1}{N}$$

or an input voltage signal of the multi-level buck converter, $$(1 \pm k\%) \times \frac{2}{N}$$

of the input voltage signal, . . . , or $$(1 \pm k\%) \times \frac{N-1}{N}$$

of the input voltage signal, wherein k is a proportional coefficient.

BRIEF DESCRIPTION OF DRAWINGS

The present invention can be further understood with reference to the following detailed description and the appended drawings, wherein like elements are provided with like reference numerals.

DETAILED DESCRIPTION OF THE INVENTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail so as not to unnecessarily obscure aspects of the present invention.

Reference to "one embodiment", "an embodiment", "an example" or "examples" means: certain features, structures, or characteristics are contained in at least one embodiment of the present invention. These "one embodiment", "an embodiment", "an example" and "examples" are not necessarily directed to the same embodiment or example. Furthermore, the features, structures, or characteristics may be combined in one or more embodiments or examples. In addition, it should be noted that the drawings are provided for illustration, and are not necessarily to scale. And when an element is described as "connected" or "coupled" to another element, it can be directly connected or coupled to the other element, or there could exist one or more intermediate elements. In contrast, when an element is referred to as "directly connected" or "directly coupled" to another element, there is no intermediate element.

Figure 1:
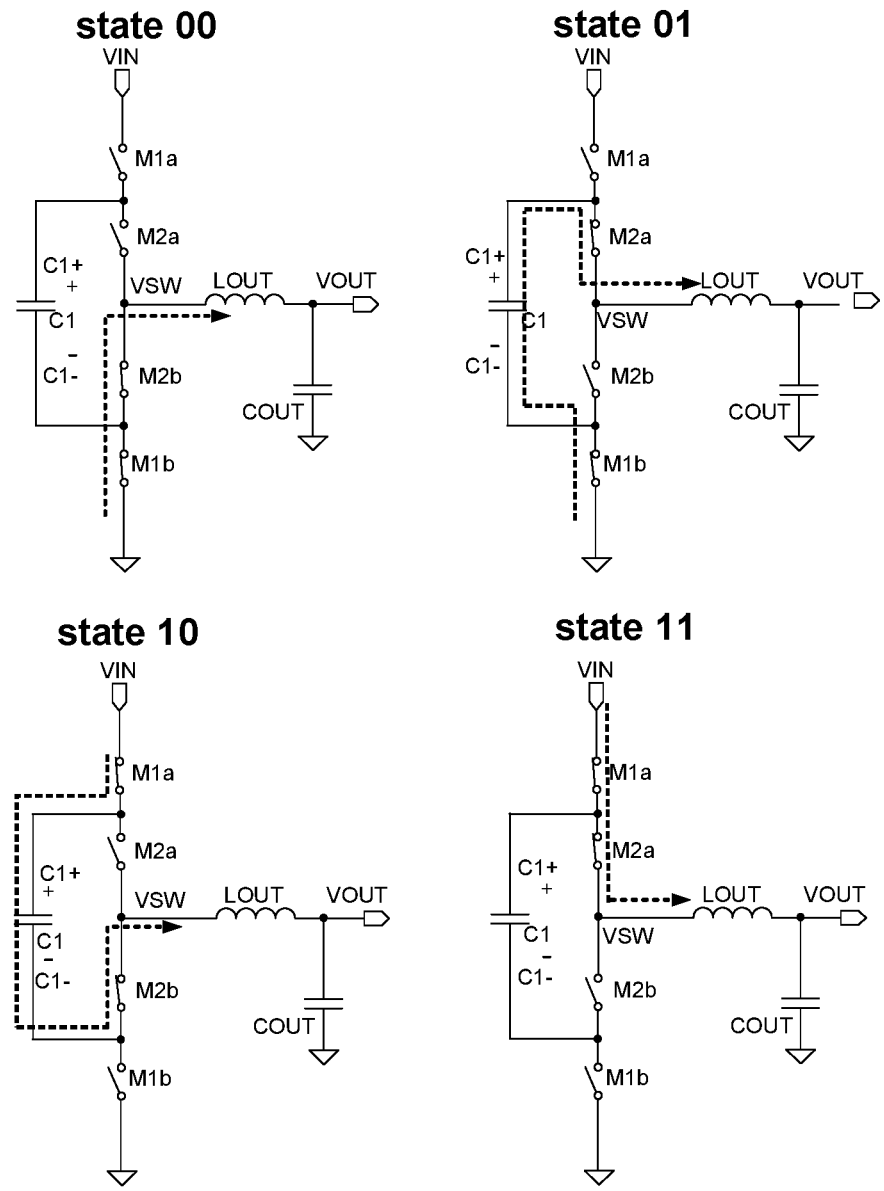
FIG. 1 illustrates switching states of a prior art three-level buck converter.
Figure 2:
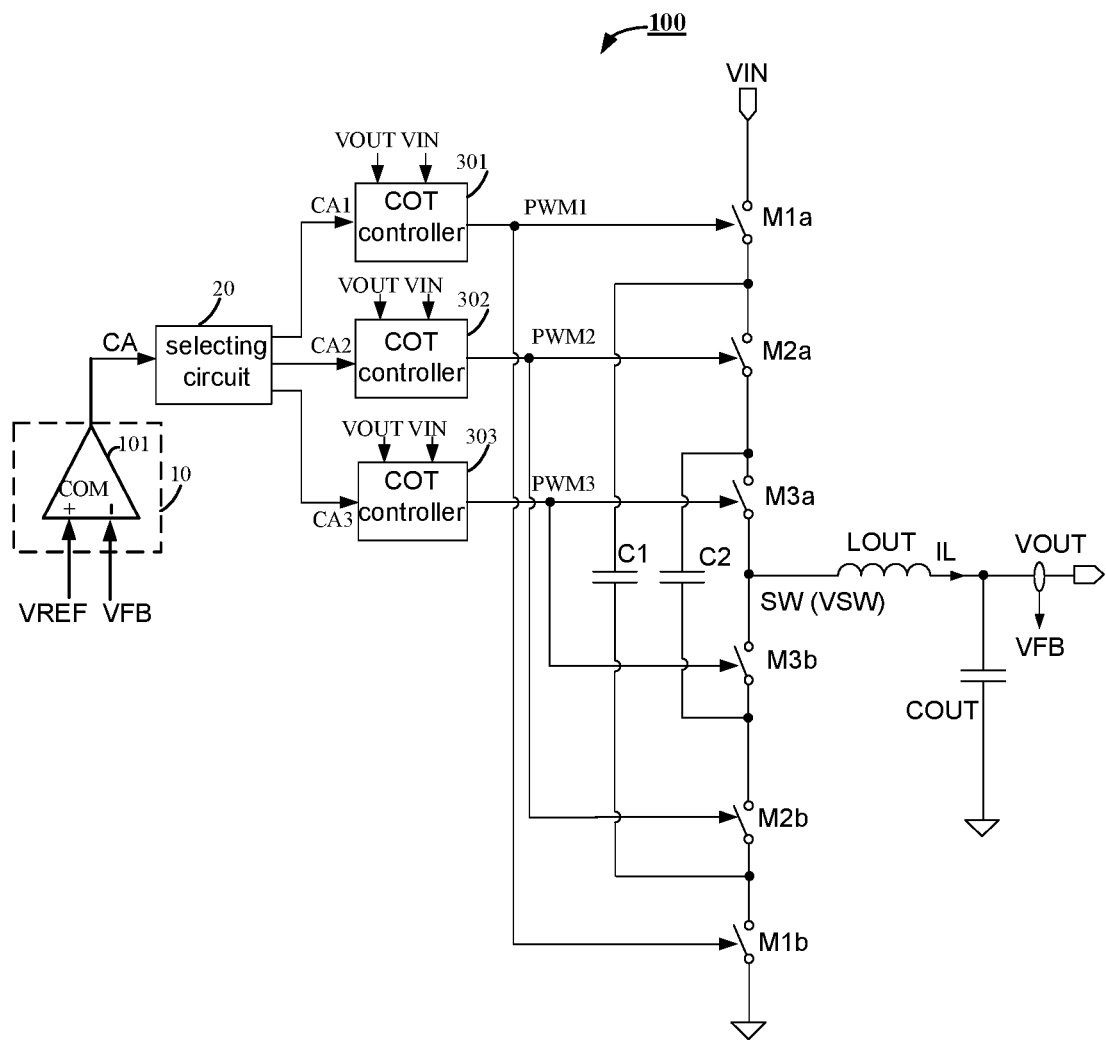
FIG. 2 schematically illustrates a four-level buck converter 100 in accordance with an embodiment of the present invention.

FIG. 2 schematically illustrates a four-level buck converter 100 in accordance with an embodiment of the present invention. In the embodiment shown in FIG. 2, the four-level buck converter 100 may comprise three pairs of switch transistors (M1a, M1b, M2a, M2b, M3a and M3b), a first flying capacitor C1, a second capacitor C2, an output capacitor COUT and an inductor LOUT arranged in a conventional fashion. In detail, a first high side switch transistor M1a, a second high side switch transistor M2a and a third high side switch transistor M3a are successively connected in series between an input node of the four-level buck converter 100 for receiving an input voltage signal VIN and a switching node SW; a first low side switch transistor M1b, a second low side switch transistor M2b and a third low side switch transistor M3b are successively connected in series between a logic ground and the switching node SW. The first flying capacitor C1 is connected between a common connection of the first high side switch transistor M1a and the second high side switch transistor M2a and a common connection of the first low side switch transistor M1b and the second low side switch transistor M2b. The second flying capacitor C2 is connected between a common connection of the second high side switch transistor M2a and the third high side switch transistor M3a, and a common connection of the second low side switch transistor M2b and the third low side switch transistor M3b. The inductor LOUT is connected between the switching node SW and an output terminal of the four-level buck converter 100 for providing an output voltage signal VOUT. The output capacitor COUT is connected between the output terminal of the four-level buck converter 100 and the logic ground.

Note that the switch node voltage signal VSW at the switching node SW may comprise four voltage potentials: one-third of the potential of the input voltage signal VIN (labeled as ⅓ VIN), two-third of the potential of the input voltage signal VIN (labeled as ⅔ VIN), the potential of the input voltage signal VIN (labeled as VIN) and the potential of the logic ground (labeled as 0V). Given these four possible potentials, the multi-level buck converter illustrated in FIG. 2 may be denoted as a four-level buck converter.

In the exemplary embodiment of FIG. 2, the four-level buck converter 100 may further comprise a control circuit comprising a comparing circuit 10, a selecting circuit 20, and three COT controllers (301, 302 and 303).

In the exemplary embodiment of FIG. 2, the comparing circuit 10 may have a first input terminal configured to receive a voltage feedback signal VFB indicative of the output voltage signal VOUT, a second input terminal configured to receive a reference signal VREF, and an output terminal. The comparing circuit 10 may be configured to compare the voltage feedback signal VFB with the reference signal VREF to generate a comparing signal CA at its output terminal. The comparing signal CA may be a logic signal having an active state (e.g., the logic high state) and an inactive state (e.g., the logic low state). In an embodiment, the comparing signal CA is in the active state when the voltage feedback signal VFB is smaller than the reference signal VREF, and the comparing signal CA is in the inactive state when the voltage feedback signal VFB is larger than the reference signal VREF. In an embodiment, the comparing circuit 10 may comprise a voltage comparator 101 having a non-inverting terminal, an inverting terminal and an output terminal. In an embodiment, the inverting terminal of the voltage comparator 101 is operated as the first input terminal of the comparing circuit 10, and the non-inverting terminal of the voltage comparator 101 is operated as the second input terminal of the comparing circuit 10.

In the exemplary embodiment of FIG. 2, the selecting circuit 20 may be configured to receive the comparing signal CA, and further configured to generate three set signals (CA1, CA2 and CA3) based on the comparing signal CA. The three set signals (CA1, CA2 and CA3) may be logic signals having an active state (e.g., the logic high state) and an inactive state (e.g., the logic low state). Each of the three set signals (CA1, CA2 and CA3) is configured to trigger a corresponding COT controller when its state changes from the inactive state to the active state. In an embodiment, the three set signals (CA1, CA2 and CA3) take turns to change from the inactive state to the active state at each rising edge of the comparing signal CA. For example, when the rising edge of the comparing signal CA is arrived for the first time, only the first set signal CA1 is in the active state; when the rising edge of the comparing signal CA is arrived for the second time, only the second set signal CA2 is in the active state; when the rising edge of the comparing signal CA is arrived for the third time, only the third set signal CA3 is in the active state; and when the comparing signal CA is in the active state for the fourth time, the first set signal CA1 is back to the active state again, and so forth.

The first COT controller 301 may be configured to receive the output voltage signal VOUT, the input voltage signal VIN and the first set signal CA1 When the first set signal CA1 is in the active state, the first COT controller 301 may be configured to generate a first control signal PWM1 in accordance with the output voltage signal VOUT, the input voltage signal VIN and the first set signal CA1 to control the first pair of switching transistors M1a and M1b. In an embodiment, when the first set signal CA1 is in the active state, the first control signal PWM1 is configured to turn the first high side switch transistor M1a on and turn the first low side switch transistor M1b off.

The second COT controller 302 may be configured to receive the output voltage signal VOUT, the input voltage signal VIN and the second set signal CA2. When the second set signal CA2 is in the active state, the second COT controller 302 may be configured to generate a second control signal PWM2 in accordance with the output voltage signal VOUT, the input voltage signal VIN and the second set signal CA2 to control the second pair of switching transistors M2a and M2b. In an embodiment, when the second set signal CA2 is in the active state, the second control signal PWM2 is configured to turn the second high side switch transistor M2a on and turn the second low side switch transistor M2b off.

The third COT controller 303 may be configured to receive the output voltage signal VOUT, the input voltage signal VIN and the third set signal CA3. When the third set signal CA3 is in the active state, the third COT controller 303 may be configured to generate a third control signal PWM3 in accordance with the output voltage signal VOUT, the input voltage signal VIN and the third set signal CA3 to control the third pair of switching transistors M3a and M3b. In an embodiment, when the third set signal CA3 is in the active state, the third control signal PWM3 is configured to turn the third high side switch transistor M3a on and turn the third low side switch transistor M3b off.

In an embodiment, each of the first, the second and the third control signal PWM1-PWM3 may comprise a high side control signal and a low side control signal to respectively control the corresponding pair of switching transistors. For example, the first control signal PWM1 may comprise a first high side control signal PWM1a (as illustrated in the following FIG. 8) and a first low side control signal PWM1b (as illustrated in the following FIG. 8) to respectively control the first high side switch transistor M1a and the first low side switch transistor M1b to have a complementary on and off state, i.e., the first high side switch transistor M1a is on while the first low side switch transistor M1b is off, and vice versa. Similarly, the second control signal PWM2 may be configured to control the second high side switch transistor M2a and the second low side switch transistor M2b to have a complementary on and off state; and the third control signal PWM3 may be configured to control the third high side switch transistor M3a and the third low side switch transistor M3b to have a complementary on and off state.

Figure 3:
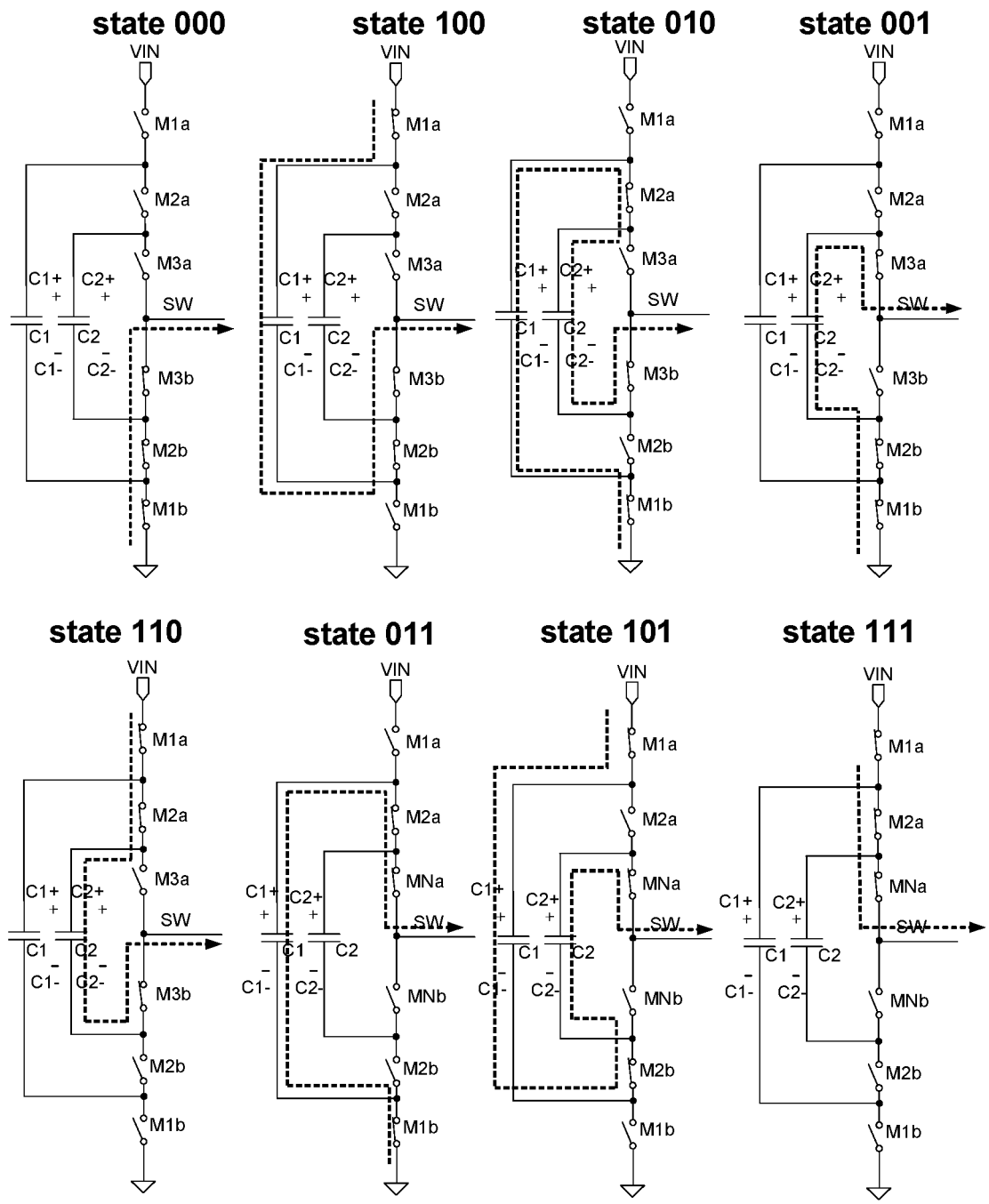
FIG. 3 illustrates switching states of the four-level buck converter 100 of FIG. 2 in accordance with an embodiment of the present invention.

In the exemplary embodiment of FIG. 2, the four-level buck converter 100 has eight switching states: 000, 100, 010, 001, 110, 011, 101, 111 as shown in FIG. 3. Similarly, "1" herein denotes a high side switch transistor (e.g., M1a, M2a, or M3a) is on while its corresponding low side switch (e.g., M1b, M2b, or M3b) transistor is off, and "0" denotes the high side transistor is off while its corresponding low side switch transistor is on. In each of the eight switching states, only three of six switch transistors are on.

As shown in FIG. 3, in switching state 000, switch transistors M1a, M2a and M3a are off while switch transistors M1b, M2b and M3b are on such that an inductor current IL flowing through the inductor LOUT is freewheeling through switch transistors M1b, M2b and M3b.

In switching state 100, switch transistors M1a, M2b and M3b are on while switch transistors M1b, M2a and M3a are off such that the first flying capacitor voltage C1 is charged by the input voltage signal VIN to drive the switch node voltage signal VSW at ⅓ VIN. Meanwhile, the second flying capacitor C2 is floating during switching state 100.

In switching state 010, switch transistors M1a, M2b and M3a are off while switch transistors M1b, M2a and M3b are on such that the first flying capacitor voltage C1 is discharged and the second flying capacitor C2 is charged to drive the switch node voltage signal VSW at VIN.

In switching state 001, switch transistors M1a, M2a and M3b are off while switch transistors M1b, M2b and M3a are on such that the second flying capacitor C2 is discharged to drive the switch node voltage signal VSW at ⅓ VIN. Meanwhile, the first flying capacitor C1 is floating during switching state 001.

In switching state 110, switch transistors M1a, M2a and M3b are on while switch transistors M1b, M2b and M3a are off such that the second flying capacitor C2 is charged by the input voltage signal VIN to drive the switch node voltage signal VSW at ⅔ VIN. Meanwhile, the first flying capacitor C1 is floating during switching state 110.

In switching state 011, switch transistors M1a, M2b and M3b are off while switch transistors M1b, M2a and M3a are on such that the first flying capacitor voltage C1 is discharged to drive the switch node voltage signal VSW at 3 VIN. Meanwhile, the second flying capacitor C2 is floating during switching state 011.

In switching state 101, switch transistors M1a, M2b and M3a are on while M1b, M2a and M3b are off such that the first flying capacitor voltage C1 is charged and the second flying capacitor C2 is discharged to drive the switch node voltage signal VSW at ⅔ VIN.

In switching state 111, switch transistors M1a, M2a and M3a are on while M1b, M2b and M3b are off such that the switch node voltage signal VSW is charged to be equal to the input voltage signal VIN.

The switching states of the four-level buck converter 100 are summarized in the following Table 3:

TABLE 3

| | States of Switch Transistors | | | | | | | |
|---|---|---|---|---|---|---|---|---|
| States | 000 | 001 | 010 | 011 | 100 | 101 | 110 | 111 |
| M1a | Off | Off | Off | Off | On | On | On | On |
| M2a | Off | Off | On | On | Off | Off | On | On |
| M3a | Off | On | Off | On | Off | On | Off | On |
| M1b | On | On | On | On | Off | Off | Off | Off |
| M2b | On | On | Off | Off | On | On | Off | Off |
| M3b | On | Off | On | Off | On | Off | On | Off |

Furthermore, Table 4 illustrates a potential of the switch node voltage signal VSW, a potential of the first terminal of the first flying capacitor C1+, a potential of the second terminal of the first flying capacitor C1−, a potential of the first terminal of the second flying capacitor C2+, and a potential of the second terminal of the second flying capacitor C2− for different switching states.

TABLE 4

Potentials for Different Switching States

| States | SW | C1+ | C2+ | C1− | C2− |
|---|---|---|---|---|---|
| 000 | 0 V | ⅔ VIN | ⅓ VIN | 0 V | 0 V |
| 100 | ⅓ VIN | VIN | ⅔ VIN | ⅓ VIN | ⅓ VIN |
| 010 | ⅓ VIN | ⅔ VIN | ⅔ VIN | 0 V | ⅓ VIN |
| 001 | ⅓ VIN | ⅔ VIN | ⅓ VIN | 0 V | 0 V |
| 110 | ⅔ VIN | VIN | VIN | ⅓ VIN | ⅔ VIN |
| 011 | ⅔ VIN | ⅔ VIN | ⅔ VIN | 0 V | ⅓ VIN |
| 101 | ⅔ VIN | VIN | ⅔ VIN | ⅓ VIN | ⅓ VIN |
| 111 | VIN | VIN | VIN | ⅓ VIN | ⅔ VIN |

As compared to a conventional buck converter, the root-mean-square (RMS) of the switch node voltage signal VSW of the four-level buck converter 100 is reduced by ⅔. From Table 4, it could be found that the potential of the switch node voltage signal VSW is switched among a potential of the logic ground (labeled as 0V), one-third of the potential of the input voltage signal VIN (labeled as ⅓ VIN), two-third of the potential of the input voltage signal VIN (labeled as ⅔ VIN), and the potential of the input voltage signal VIN (labeled as VIN). Meanwhile, the four-level buck converter has a first, a second, and a third operation states by controlling the set of six switch transistors operating and transiting in the eight switching states. Specifically, in the first operation state, the switch node voltage signal VSW is switched between 0V and ⅓ VIN if the output voltage signal VOUT is smaller than one-third of the input voltage signal VIN. In the second operation state, the potential of the switch node voltage signal VSW is switched between ⅓ VIN and ⅔ VIN if the output voltage signal VOUT is greater than one-third of the input voltage signal VIN and smaller than two-third of the input voltage signal VIN. In the third operation state, the potential of the switch node voltage signal VSW is switched between ⅔ VIN and VIN if the output voltage signal VOUT is greater than two-third of the input voltage signal VIN and smaller than the input voltage signal VIN.

Figure 4:
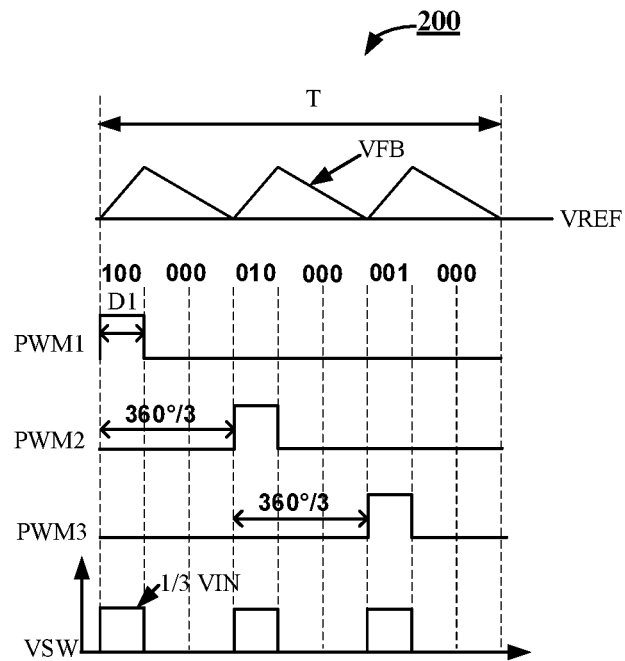
FIG. 4 illustrates an operation waveform diagram 200 illustrating operation of the four-level buck converter 100 whose duty cycle has a range from zero to ⅓ in accordance with an embodiment of the present invention.

FIG. 4 illustrates an operation waveform diagram 200 of the four-level buck converter 100 whose duty cycle has a range from zero to ⅓ in accordance with an embodiment of the present invention. In an embodiment, the duty cycle of the four-level buck converter 100 is defined as the ratio of the output voltage signal VOUT to the input voltage signal VIN. A range of the duty cycle of the four-level buck converter 100 from zero to ⅓ means that the output voltage signal VOUT may be regulated in a range of $$0 \sim \frac{1}{3} VIN.$$

As shown in FIG. 4, the diagram 200 illustrates the feedback signal VFB, the reference signal VREF, the first control signal PWM1, the second control signal PWM2, the third control signal PWM3 and the switch node voltage signal VSW from top-to-bottom. The corresponding switching states in one switching period T are in order as follows: 100, 000, 010, 000, 001, and 000. FIG. 4 also illustrates that the first control signal PWM1, the second control signal PWM2 and the third control signal PWM3 take turns to have a phase shift of 120° in one switching period T. That is to say, the first high side switch transistor M1a, the second high side switch transistor M2a and the third high side switch transistor M3a take turns to be on in one switching period T. Since the duty cycle range of the four-level buck converter 100 is from zero to ⅓, the on time D1 of each of the switch transistors (M1a, M2a, and M3a) is changed from zero to ⅓ T in the light of the changes of the output voltage signal VOUT.

Figure 5:
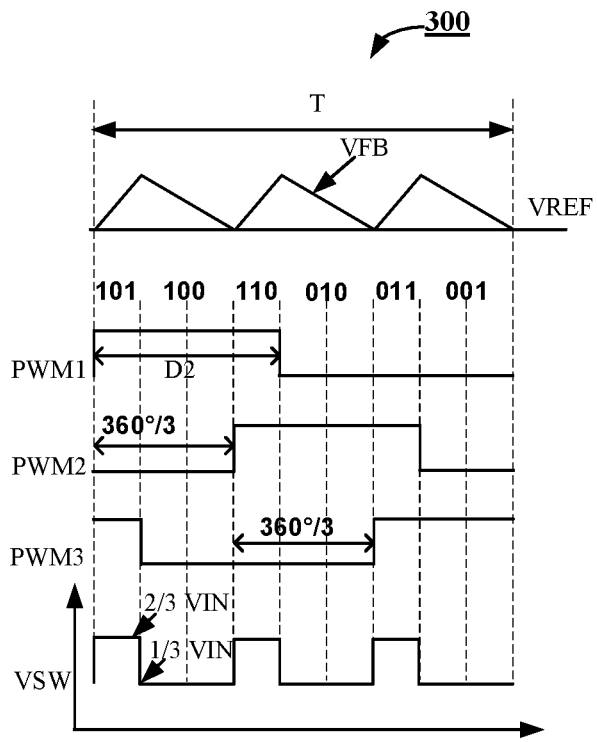
FIG. 5 illustrates an operation waveform diagram 300 illustrating operation of the four-level buck converter 100 whose duty cycle has a range from ⅓ to ⅔ in accordance with an embodiment of the present invention.

FIG. 5 illustrates an operation waveform diagram 300 of the four-level buck converter 100 whose duty cycle has a range from ⅓ to ⅔ in accordance with an embodiment of the present invention. A range of the duty cycle of the four-level buck converter 100 from ⅓ to ⅔ means that the output voltage signal VOUT may be regulated in a range of $$\frac{1}{3} VIN \sim \frac{2}{3} VIN.$$

As shown in FIG. 5, the diagram 300 illustrates the feedback signal VFB, the reference signal VREF, the first control signal PWM1, the second control signal PWM2, the third control signal PWM3 and the switch node voltage signal VSW from top-to-bottom. The corresponding switching states in one switching period T are in order as follows: 101, 100, 110, 010, 011, and 001. FIG. 5 also illustrates that the first control signal PWM1, the second control signal PWM2 and the third control signal PWM3 take turns to have a phase shift of 120° in one switching period T. That is to say, the first high side switch transistor M1a, the second high side switch transistor M2a and the third high side switch transistor M3a take turns to be on in one switching period T. Since the duty cycle range of the four-level buck converter 100 is from ⅓ to ⅔, the on time D2 of each of the switch transistors (M1a, M2a, and M3a) is changed from ⅓ T to ⅔ T in the light of the changes of the output voltage signal VOUT.

Figure 6:
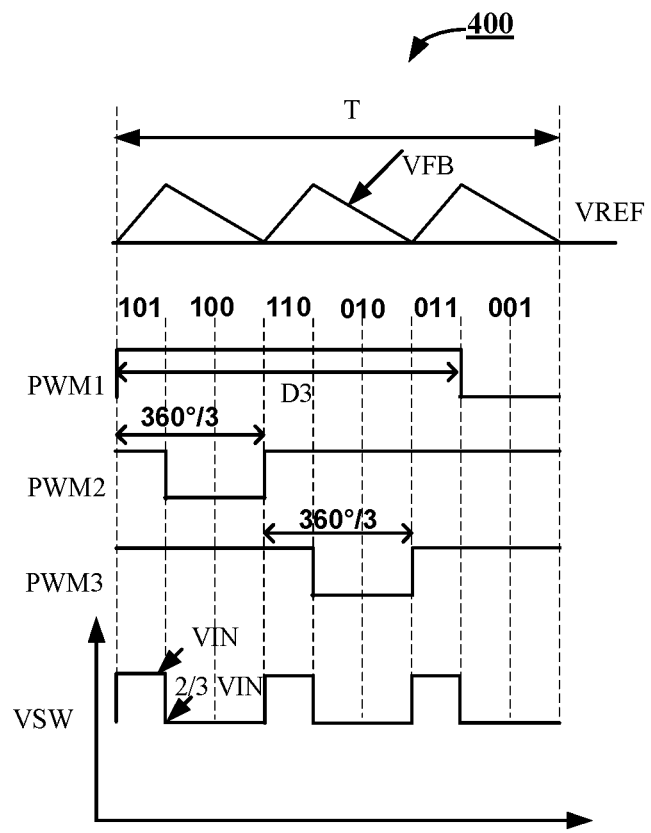
FIG. 6 illustrates an operation waveform diagram 400 illustrating operation of the four-level buck converter 100 whose duty cycle is larger than ⅔ in accordance with an embodiment of the present invention.

FIG. 6 illustrates an operation waveform diagram 400 illustrating operation of the four-level buck converter 100 whose duty cycle is larger than ⅔ in accordance with an embodiment of the present invention. A range of the duty cycle of the four-level buck converter 100 from ⅔ to 1 means that the output voltage signal VOUT may be regulated in a range of $$\frac{2}{3} VIN \sim VIN.$$

As shown in FIG. 6, the diagram 400 illustrates the feedback signal VFB, the reference signal VREF, the first control signal PWM1, the second control signal PWM2, the third control signal PWM3 and the switch node voltage signal VSW from top-to-bottom. The corresponding switching states in one switching period T are in order as follows: 101, 100, 110, 010, 011, and 001. FIG. 6 also illustrates that the first control signal PWM1, the second control signal PWM2 and the third control signal PWM3 take turns to have a phase shift of 120° in one switching period T. That is to say, the first high side switch transistor M1a, the second high side switch transistor M2a and the third high side switch transistor M3a take turns to be on in one switching period T. Since the duty cycle range of the four-level buck converter 100 is from ⅔ to 1, the on time D3 of each switch transistor is changed from ⅔ T to T in the light of the changes of the output voltage signal VOUT.

Figure 7:
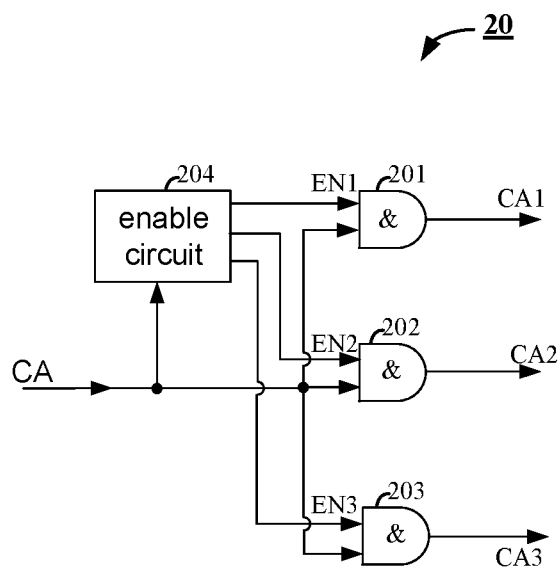
FIG. 7 schematically illustrates the selecting circuit 20 of FIG. 2 in accordance with an embodiment of the present invention.

FIG. 7 schematically illustrates the selecting circuit 20 of FIG. 2 in accordance with an embodiment of the present invention. As shown in FIG. 7, the selecting circuit 20 may comprise a first AND logic gate 201, a second AND logic gate 202, a third AND logic gate 203, and an enable circuit 204. The enable circuit 204 is configured to receive the comparing signal CA, and further configured to generate a first enable signal EN1, a second enable signal EN2 and a third enable signal EN3 based on the comparing signal CA. In an embodiment, the first enable signal EN1, the second enable signal EN2 and the third enable signal EN3 may be logic signals having an active state (e.g., the logic high state) and an inactive state (e.g., the logic low state). In an embodiment, the first enable signal EN1, the second enable signal EN2 and the third enable signal EN3 take turns to change from the inactive state to the active state. For example, one of the enable signals, e.g., the first enable signal EN1, is in the active state (e.g., the logic high state) at first, after a first rising edge of the comparing signal CA is arrived for a certain period, the first enable signal EN1 is back to the inactive state and the second enable signal EN2 is changed from the inactive state (e.g., the logic low state) to the active state (e.g., the logic high state). Similarly, after a second rising edge of the comparing signal CA is arrived for the certain period, the second enable signal EN2 is back to the inactive state and the third enable signal EN3 is changed from the inactive state to the active state. In next switching period, the first enable signal EN1 is changed to the active state again after a third rising edge of the comparing signal CA is arrived for the certain period, while the third enable signal EN3 is back to the inactive state, and so forth. In an embodiment, the certain period may be smaller than ⅓ T, and could be set by customers in accordance with different applications.

The first AND logic gate 201 is configured to receive the comparing signal CA and the first enable signal EN1, and further configured to conduct a logic AND operation of the comparing signal CA and the first enable signal EN1 to generate the first set signal CA1.

The second AND logic gate 202 is configured to receive the comparing signal CA and the second enable signal EN2, and further configured to conduct a logic AND operation of the comparing signal CA and the second enable signal EN2 to generate the second set signal CA2.

The third AND logic gate 203 is configured to receive the comparing signal CA and the third enable signal EN3, and further configured to conduct a logic AND operation of the comparing signal CA and the third enable signal EN3 to generate the third set signal CA3.

Figure 8:
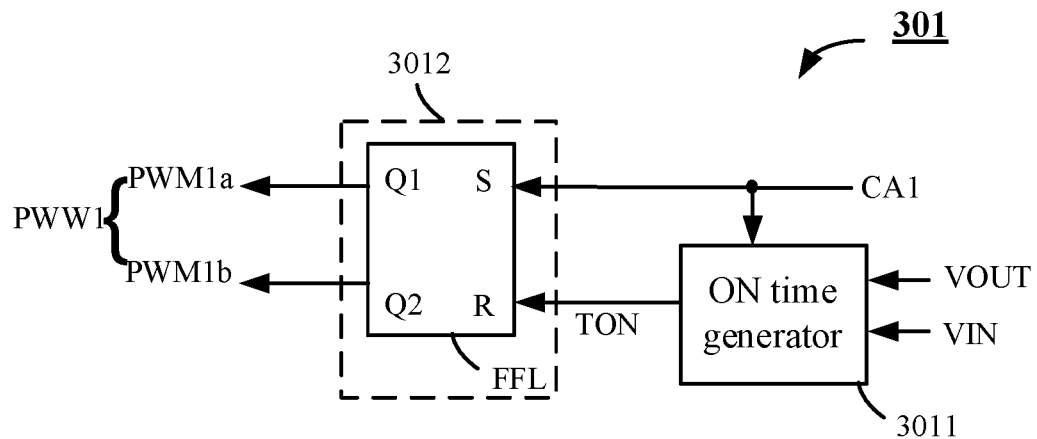
FIG. 8 schematically illustrates the first COT controller 301 of FIG. 2 in accordance with an embodiment of the present invention.

FIG. 8 schematically illustrates the first COT controller 301 of FIG. 2 in accordance with an embodiment of the present invention. As shown in FIG. 8, the COT controller 301 may comprise an ON time generator 3011 and a logic circuit 3012. In the exemplary embodiment of FIG. 8, the ON time generator 3011 may be configured to receive the first set signal CA1, the input voltage signal VIN and the output voltage signal VOUT to generate an on time signal TON. The on time signal TON may comprise a logic signal having an active state and an inactive state. The logic circuit 3012 may be configured to receive the first set signal CA1 and the on time signal TON, and further configured to conduct a logic operation of the first set signal CA1 and the on time signal TON to generate the first control signal PWM1. In an embodiment, the logic circuit 3012 may be illustrated as a RS flip-flop FFL. The RS flip-flop FFL may comprise a set terminal S configured to receive the first set signal CA1, a reset terminal R configured to receive the on time signal TON, a first output terminal Q1 to provide the first high side control signal PWM1a and a second output terminal Q2 to provide the first low side control signal PWM1b.

As can be appreciated, FIG. 8 only schematically illustrates the first COT controller 301 of FIG. 2, and the second COT controller 302 and the third COT controller 303 could be obtained under teaching of FIG. 8. Here will not describe for simplicity.

Figure 9:
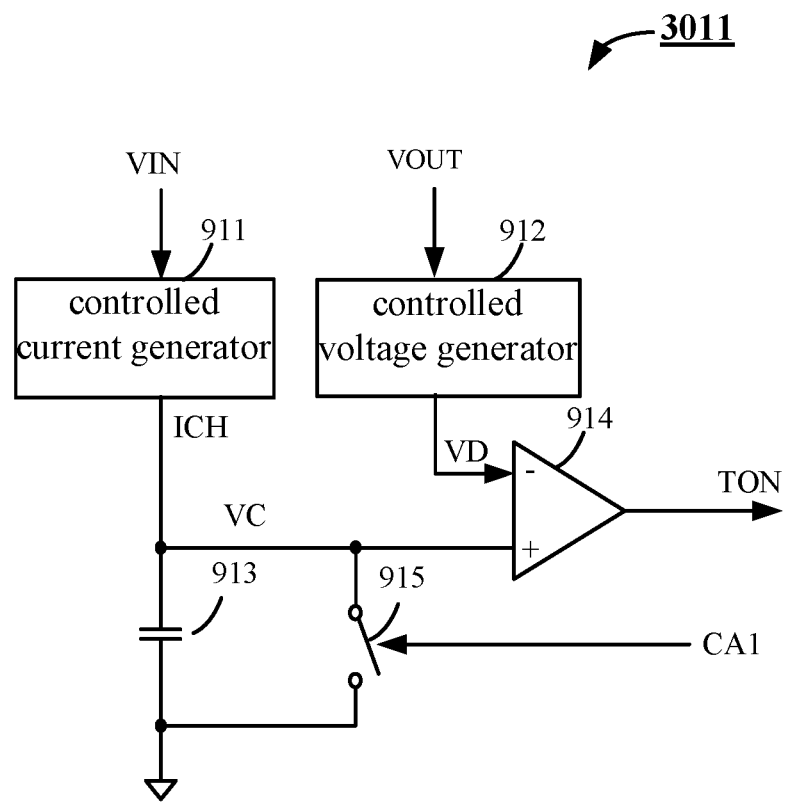
FIG. 9 schematically illustrates the ON time generator 3011 of FIG. 8 in accordance with an embodiment of the present invention.

FIG. 9 schematically illustrates the ON time generator 3011 of FIG. 8 in accordance with an embodiment of the present invention. In the exemplary embodiment of FIG. 9, the ON time generator 3011 may comprise a controlled current generator 911, a controlled voltage generator 912, a capacitor 913, a charge comparator 914, and a reset switch 915. The controlled current generator 911 may be configured to receive input voltage signal VIN to generate a controlled current signal ICH. In an embodiment, the controlled current signal ICH is proportional to the input voltage signal VIN. The capacitor 913 may be connected between an output terminal of controlled current generator 911 and the logic ground. The controlled current signal ICH is configured to charge the capacitor 913 to generate a capacitor voltage signal VC across the capacitor 913. The controlled voltage generator 912 may be configured to receive the output voltage signal VOUT to generate a controlled voltage signal VD. In an embodiment, the controlled voltage signal VD is proportional to the output voltage signal VOUT. The charge comparator 914 may have a first input terminal configured to receive the controlled voltage signal VD, a second input terminal configured to receive the capacitor voltage signal VC, and an output terminal. The charge comparator 914 may be configured to compare the controlled voltage signal VD with the capacitor voltage signal VC to generate the on time signal TON. The reset switch 915 may have a first terminal coupled to the output terminal of controlled current generator 911, a second terminal connected to the logic ground, and a control terminal configured to receive the first set signal CA1. When the first set signal CA1 controls the reset switch 913 on, the capacitor 913 is discharged via the reset switch 915. When the first set signal CA1 controls the reset switch 915 off, the controlled current signal ICH may begin to charge the capacitor 913.

Figure 10:
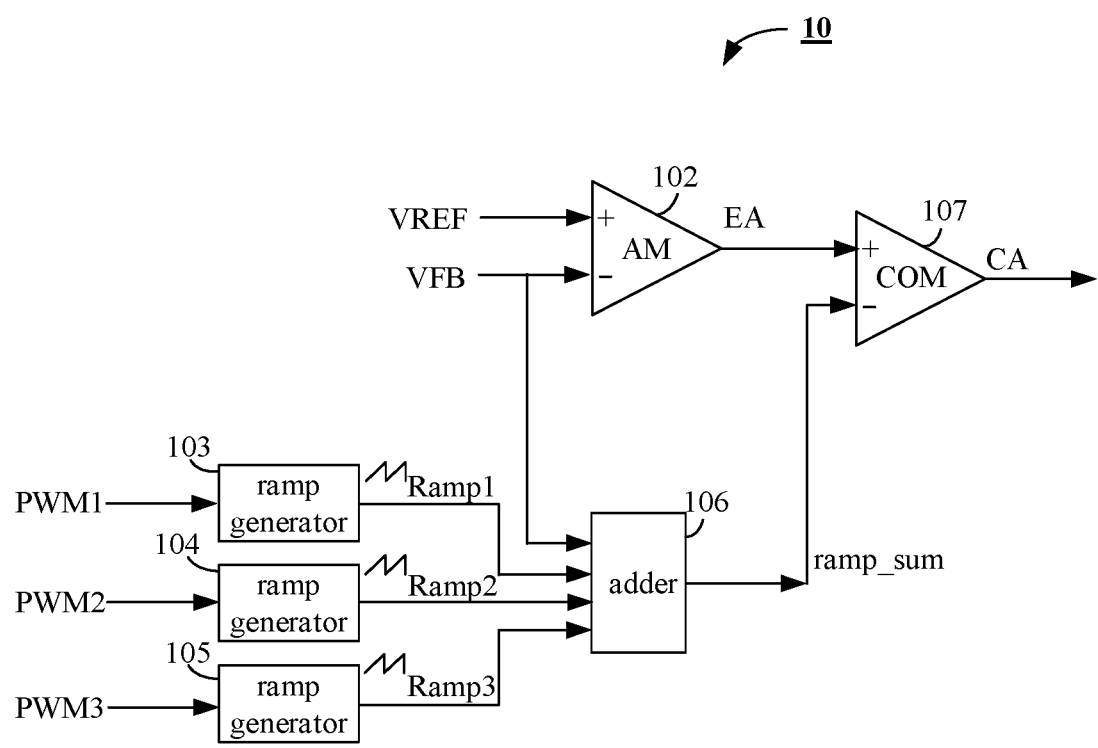
FIG. 10 schematically illustrates the comparing circuit 10 of FIG. 2 in accordance with other embodiments of the present invention.

FIG. 10 schematically illustrates the comparing circuit 10 of FIG. 2 in accordance with other embodiments of the present invention. In the exemplary embodiment of FIG. 10, the comparing circuit 10 may comprise an error amplifier 102, a ramp generator 103, a ramp generator 104, a ramp generator 105, an adder 106, and a voltage comparator 107.

The error amplifier 102 may have a first input terminal configured to receive the voltage feedback signal VFB, a second input terminal configured to receive the reference signal VREF, and an output terminal. The error amplifier 102 may be configured to compare the voltage feedback signal VFB with the reference signal VREF to generate an error signal EA at its output terminal, wherein the error signal EA is indicative of the difference of the voltage feedback signal VFB and the reference signal VREF.

The ramp generator 103 may be configured to receive the first control signal PWM1, and start to generate a ramp signal Ramp1 at the moment once the first high side switch transistor M1a is turned on, e.g., the first control signal PWM1 is changed from the inactive stage to the active state, in each switching period T.

The ramp generator 104 may be configured to receive the second control signal PWM2, and start to generate a ramp signal Ramp2 at the moment once the second high side switch transistor M2a is turned on, e.g., the second control signal PWM2 is changed from the inactive stage to the active state, in each switching period T.

The ramp generator 105 may be configured to receive the third control signal PWM3, and start to generate a ramp signal Ramp3 at the moment once the third high side switch transistor M3a is turned on, e.g., the third control signal PWM3 is changed from the inactive stage to the active state, in each switching period T.

The adder 106 may be configured to receive the voltage feedback signal VFB, the ramp signal Ramp1, the ramp signal Ramp2, and the ramp signal Ramp3, and further configured to conduct an add operation of the voltage feedback signal VFB, the ramp signal Ramp1, the ramp signal Ramp2 and the ramp signal Ramp3 to generate a sum signal Ramp_sum.

The voltage comparator 107 may have a first input terminal configured to receive the error signal EA, a second input terminal configured to receive the sum signal Ramp_sum, and an output terminal. The voltage comparator 107 may be configured to compare the error signal EA with the sum signal Ramp_sum to generate the comparing signal CA at its output terminal. In an embodiment, the comparing circuit 10 of FIG. 10 can improve stability for the four-level buck converter 100.

Figure 11:
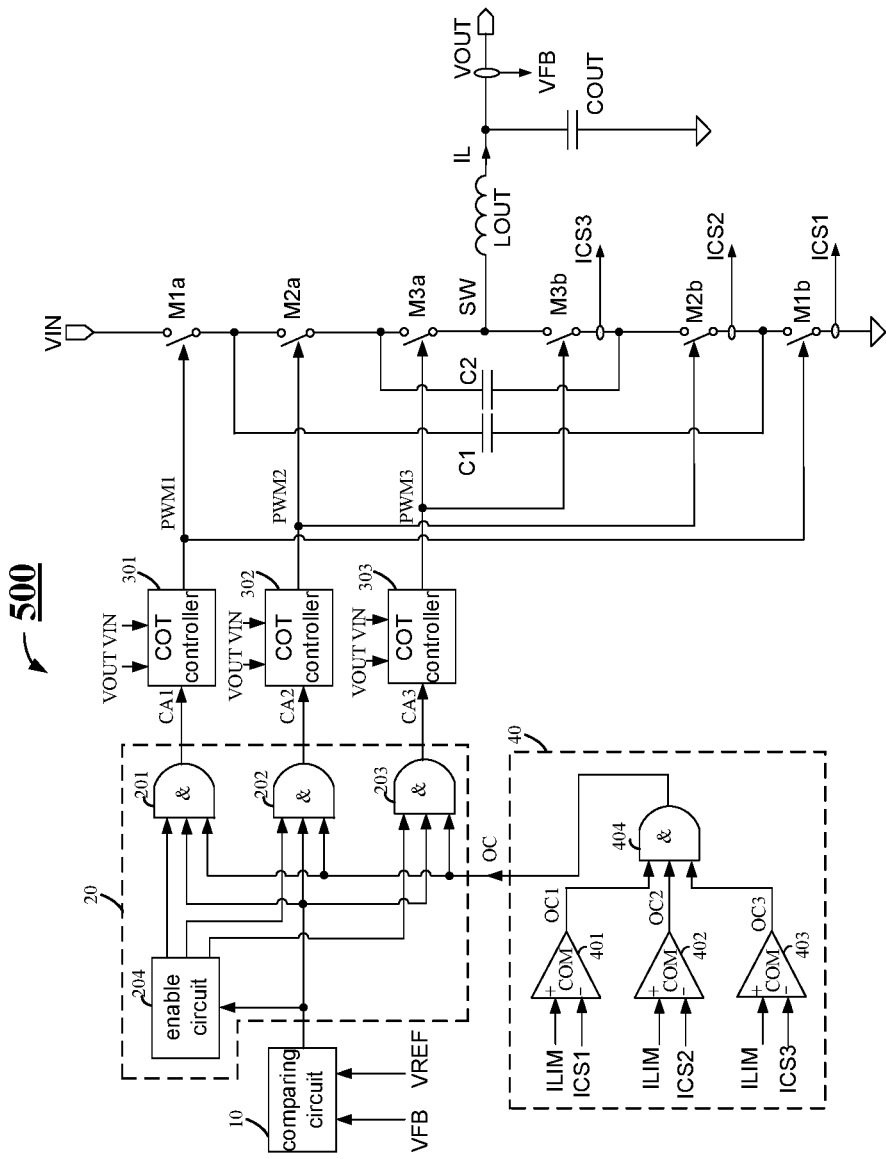
FIG. 11 schematically illustrates a four-level buck converter 500 in accordance with an embodiment of the present invention.

FIG. 11 schematically illustrates a four-level buck converter 500 in accordance with an embodiment of the present invention. Comparing with the four-level buck converter 100 of FIG. 2, the four-level buck converter 500 may further comprise a current limiting circuit 40. The current limiting circuit 40 may comprise a first input terminal, a second input terminal, a third input terminal, and an output terminal. The first input terminal of the current limiting circuit 40 is coupled to a common node of the first low side switch transistor M1b and the logic ground to receive a current sense signal CS1 that is indicative of the current flowing through the first low side switch transistor M1b. The second input terminal of the current limiting circuit 40 is coupled to a common node of the first low side switch transistor M1b and the second terminal of the first flying capacitor C1 to receive a current sense signal CS2 that is indicative of the current flowing through the second low side switch transistor M2b. Furthermore, the third input terminal of the current limiting circuit 40 is coupled to a common node of the third low side switch transistor M3b and the second terminal of the second flying capacitor C2 to receive a current sense signal CS3 that is indicative of the current flowing through the third low side switch transistor M3b.

The current limiting circuit 40 may be configured to determine whether these current sense signals (CS1, CS2, and CS3) are larger than a current limit value ILIM, and further configured to generate an over current instruction signal OC at the output terminal of the current limiting circuit 40. The over current instruction signal OC may be a logic signal having an active state and an inactive state. In an embodiment, the over current instruction signal OC is in the active state (e.g., the logic low state) if any one of the current sense signal CS1, the current sense signal CS2 and the current sense signal CS3 is larger than the current limit value ILIM, otherwise the over current instruction signal OC is in the inactive state (e.g., the logic high state).

In the exemplary embodiment of FIG. 11, the current limiting circuit 40 may comprise three comparators (401, 402, and 403), and an AND logic gate 404. The comparator 401 may comprise a first input terminal configured to receive the current limit value ILIM, a second input terminal configured to receive the current sense signal CS1, and an output terminal. The comparator 401 may be configured to compare the current sense signal CS1 with the current limit value ILIM to generate an instruction signal OC1 at its output terminal. The comparator 402 may comprise a first input terminal configured to receive the current limit value ILIM, a second input terminal configured to receive the current sense signal CS2, and an output terminal. The comparator 402 may be configured to compare the current sense signal CS2 with the current limit value ILIM to generate an instruction signal OC2 at its output terminal. The comparator 403 may comprise a first input terminal configured to receive the current limit value ILIM, a second input terminal configured to receive the current sense signal CS3, and an output terminal. The comparator 403 may be configured to compare the current sense signal CS3 with the current limit value ILIM to generate an instruction signal OC3 at its output terminal. The AND logic gate 404 may be configured to receive the instruction signal OC1, the instruction signal OC2 and the instruction signal OC3, and further configured to conduct a AND logic operation of the instruction signal OC1, the instruction signal OC2 and the instruction signal OC3 to generate the over current instruction signal OC.

In the exemplary embodiment of FIG. 11, the over current instruction signal OC may be sent to the selecting circuit 20. More specifically, as shown in FIG. 11, the over current instruction signal OC may be respectively sent to the first AND logic gate 201, the second AND logic gate 202 and the third AND logic gate 203. In such an application, the first AND logic gate 201 may be configured to generate the first set signal CA1 based on the comparing signal CA, the first enable signal EN1 and the over current instruction signal OC. Similarly, the second AND logic gate 202 may be configured to generate the second set signal CA2 based on the comparing signal CA, the second enable signal EN2 and the over current instruction signal OC. Moreover, the third AND logic gate 203 may be also configured to generate the third set signal CA3 based on the comparing signal CA, the third enable signal EN3 and the over current instruction signal OC. If any one of the current sense signals (CS1, CS2, and CS3) is larger than the current limit value ILIM, all of the set signals (CA1, CA2, and CA3) are inactive. In such an application, the first, second and third control signals (PWM1, PWM2 and PWM3) are configured to control the switching transistors M1b, M2b and M3b on and the switching transistors M1a, M2a and M3a off until the corresponding current sense signal decreases below the current limit value ILIM.

Figure 12:
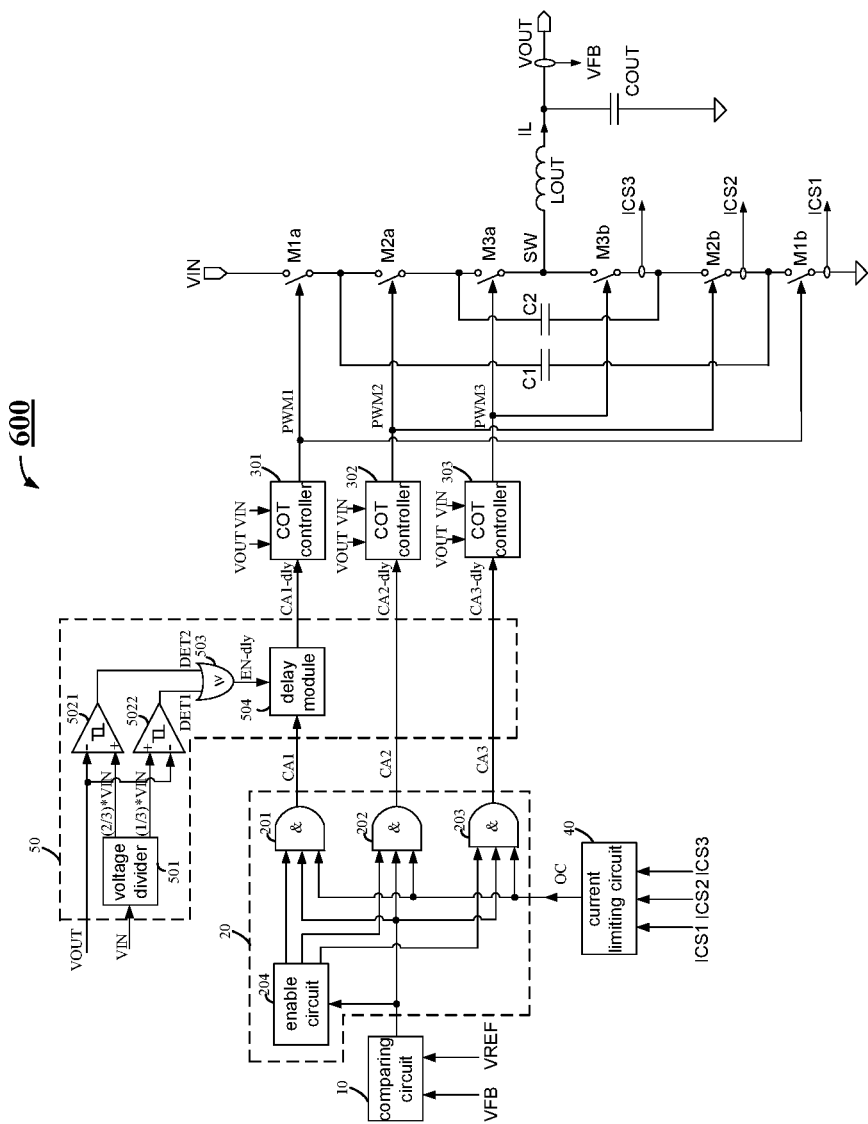
FIG. 12 schematically illustrates a four-level buck converter 600 in accordance with an embodiment of the present invention.

FIG. 12 schematically illustrates a four-level buck converter 600 in accordance with an embodiment of the present invention. In some embodiments, when the output voltage signal VOUT is close to ⅓ VIN or ⅔ VIN, which means the output voltage signal VOUT falls in $$(1 \pm k \,\%)\frac{1}{3}VIN \text{ or } (1 \pm k \,\%)\frac{2}{3}VIN,$$

the four-level buck converter 500 may have no ripples to sense so that the four-level buck converter 500 may have stability issues, wherein k is a proportional coefficient may be varied in different systems. That is to say, if the output voltage signal VOUT falls in a range from $$(1 \pm k \,\%)\frac{1}{3}VIN \text{ to } (1 \pm k \,\%)\frac{1}{3}VIN,$$

or in a range from $$(1 \pm k\ \%)\frac{2}{3}VIN \text{ to } (1 \pm k\ \%)\frac{2}{3}VIN,$$

the four-level buck converter 100 may have stability issues. In an embodiment, the proportional coefficient k is smaller than 10, e.g., 5. Comparing with the four-level buck converter 500 of FIG. 11, the four-level buck converter 600 may further comprise a delay circuit 50 for further improving stability.

The delay circuit 50 may be configured to receive the input voltage signal VIN, the output voltage signal VOUT, and three set signals (CA1, CA2, and CA3), and further configured to generate three delay set signals (CA1-dly, CA2-dly, and CA3-dly) based on the input voltage signal VIN, the output voltage signal VOUT and the three set signals (CA1, CA2, and CA3). In a four-level buck converter, only one of the set signals (CA1, CA2, or CA3) is delayed to generate a corresponding delay set signal when the output voltage signal VOUT is close to ⅓ VIN or ⅔ VIN. Meanwhile, the remaining set signals are unchanged. For instance, as shown in FIG. 12, the delay circuit 50 is illustrated to receive the input voltage signal VIN, the output voltage signal VOUT and the first set signal CA1, and delay the first set signal CA1 to generate a delay set signal CA1-dly when the output voltage signal VOUT is close to ⅓ or ⅔ VIN. Meanwhile, the second set signal CA2 and the third set signal CA3 are unchanged, i.e., the delay set signal CA2-dly is equal to the second set signal CA2, and the delay set signal CA3-dly is equal to the third set signal CA3. As can be understood, the delay circuit 50 is also can be illustrated to delay the second set signal CA2 or the third set signal CA3 to generate a delay set signal CA2-dly or a delay set signal CA3-dly when the output voltage signal VOUT is close to ⅓ VIN or ⅔ VIN.

In the exemplary embodiment of FIG. 12, the delay circuit 50 may comprise a voltage divider 501, a hysteresis comparator 5021, a hysteresis comparator 5022, an OR logic gate 503, and a delay module 504.

The voltage divider 501 is configured to receive the input voltage signal VIN to generate a dividing voltage signal having a potential of ⅓ VIN and a dividing voltage signal having a potential of ⅔ VIN.

The hysteresis comparator 5021 may be configured to receive the output voltage signal VOUT and the dividing voltage signal having the potential of ⅓ VIN, and further configured to compare the output voltage signal VOUT with the dividing voltage signal having the potential of ⅓ VIN to generate a first determining signal DET1. In an embodiment, the hysteresis comparator 5021 predetermines the proportional coefficient k. When the output voltage signal VOUT is larger than $$(1 - k\ \%)\frac{1}{3}VIN$$

while smaller than $$(1 + k\ \%)\frac{1}{3}VIN,$$

the first determining signal DET1 is in an active state (e.g., the logic high state).

The hysteresis comparator 5022 may be configured to receive the output voltage signal VOUT and the dividing voltage signal having the potential of VIN, and further configured to compare the output voltage signal VOUT and the dividing voltage signal having the potential of VIN to generate a second determining signal DET2. In an embodiment, the hysteresis comparator 5022 predetermines the proportional coefficient k. When the output voltage signal VOUT is larger than $$(1 - k\ \%)\frac{2}{3}VIN$$

while smaller than $$(1 + k\ \%)\frac{2}{3}VIN,$$

the second determining signal DET2 is in an active state (e.g., the logic high state).

The OR logic gate 503 is configured to receive the first determining signal DET1 and the second determining signal DET2, and configured to conduct a logic operation of the first determining signal DET1 and the second determining signal DET2 to generate a delay enable signal EN-dly. The delay enable signal EN-dly may be a logic signal having an active state and an inactive state. In an embodiment, the delay enable signal EN-dly is in the active state (e.g., the logic high state) if one of the first determining signal DET1 and the second determining signal DET2 is in the active state, otherwise the delay enable signal EN-dly is in the inactive state (e.g., the logic low state).

The delay module 504 may be configured to delay the first set signal CA1 to generate a delay set signal CA1-dly when the delay enable signal EN-dly is in the active state.

Figure 13:
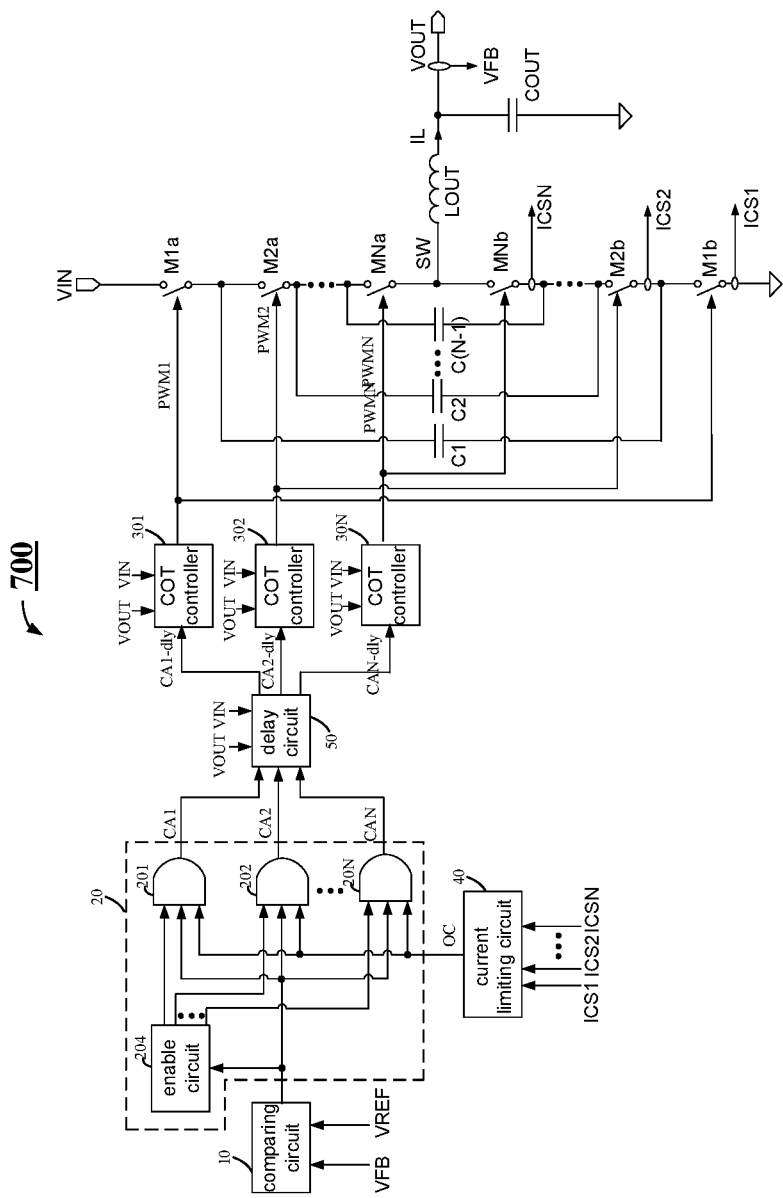
FIG. 13 schematically illustrates a multi-level buck converter 700 in accordance with an embodiment of the present invention.

FIG. 13 schematically illustrates a multi-level buck converter 700 in accordance with an embodiment of the present invention. The multi-level buck converter 700 may comprise N pairs of switch transistors (M1a, M1b, M2a, M2b, ..., MNa and MNb), N−1 flying capacitors (C1, C(N−1)), the output capacitor COUT and the inductor LOUT arranged in a conventional fashion, wherein N is an integer equal to or greater than 2. In detail, the high side switch transistors (M1a, M2a, ..., MNa) are successively connected in series between the input node for receiving the input voltage signal VIN and the switching node SW; the low side switch transistors (M1b, M2b, ..., MNb) are successively connected in series between the logic ground and the switching node SW. For each i=1, ..., N−1, the flying capacitor Ci is connected between a common connection of the high side switch transistor Mia and the high side switch transistor M(i+1)a and a common connection of the low side switch transistor Mib and the low side switch transistor M(i+1)b.

Similarly as the four-level buck converter 600, the multi-level buck converter 700 may further comprise a control circuit which comprises the comparing circuit 10, the selecting circuit 20, the current limiting circuit 40, the delay circuit 50 and N COT controllers (301, 302, ..., 30N).

In the exemplary embodiment of FIG. 13, the selecting circuit 20 of the multi-level buck converter 700 may be configured to receive the comparing signal CA, and further configured to generate N set signals (CA1, CA2, ..., CAN)

based on the comparing signal CA. Each of the N set signals (CA1, CA2, . . . , CAN) is configured to trigger a corresponding COT controller when its state is changed from an inactive state (e.g., the logic low state) to an active state (e.g., the logic high state). In an embodiment, the N set signals (CA1, CA2, . . . , CAN) take turns to change from the inactive state to the active state at each rising edge of the comparing signal CA.

The current limiting circuit 40 may be configured to determine whether any one of the N current sense signals (CS1, CS2, . . . , CSN) is larger than a current limit value ILIM, and further configured to generate the over current instruction signal OC based on the N current sense signals (CS1, CS2, . . . , CSN). If any one of the N current sense signals (CS1, CS2, . . . , CSN) is larger than the current limit value ILIM, the over current instruction signal OC is in the active state.

The delay circuit 50 may be configured to receive the input voltage signal VIN, the output voltage signal VOUT, and the N set signals (CA1, CA2, . . . , CAN), and further configured to generate N delay set signals (CA1-dly, CA2-dly, . . . , CAN-dly) when the output voltage signal VOUT is close to $$\frac{1}{N}VIN, \ldots, \text{or } \frac{N-1}{N}VIN,$$

i.e., the output voltage signal VOUT falls in $$(1 \pm k\ \%)\frac{1}{N}VIN, \ldots, \text{or } (1 \pm k\ \%)\frac{N-1}{N}VIN.$$

Herein, k is a proportional coefficient may be varied in different systems.

In an embodiment, when N is an odd number, there are (N−1)/2 set signals may be delayed. For each i=1, (N−1)/2, the delay circuit is configured to delay the $(2i-1)^{th}$ set signal CA(2i−1) to generate the $(2i-1)^{th}$ delay set signal CA(2i−1)-dly once the output voltage signal VOUT falls in $$(1 \pm k\ \%)\frac{1}{N}VIN, \ldots, \text{or } (1 \pm k\ \%)\frac{N-1}{N}VIN.$$

Meanwhile, the delay circuit 50 may be configured to keep the remaining (N+1)/2 set signals unchanged.

In an embodiment, when N is an odd number, there are (N−1)/2 set signals may be delayed. For each i=1, (N−1)/2, the delay circuit is configured to delay the $(2i^{+}1)^{th}$ set signal CA(2i+1) to generate the $(2i+1)^{th}$ delay set signal CA(2i+1)-dly once the output voltage signal VOUT falls in $$(1 \pm k\ \%)\frac{1}{N}VIN, \ldots, \text{or } (1 \pm k\ \%)\frac{N-1}{N}VIN.$$

Meanwhile, the delay circuit 50 may be configured to keep the remaining (N+1)/2 set signals unchanged.

In an embodiment, when N is an odd number, there are (N−1)/2 set signals may be delayed. For each i=1, (N−1)/2, the delay circuit is configured to delay the $(2i)^{th}$ set signal CA(2i) to generate the $(2i)^{th}$ delay set signal CA(2i)-dly once the output voltage signal VOUT falls in $$(1 \pm k\ \%)\frac{1}{N}VIN, \ldots, \text{or } (1 \pm k\ \%)\frac{N-1}{N}VIN.$$

Meanwhile, the delay circuit 50 may be configured to keep the remaining (N+1)/2 set signals unchanged.

In an embodiment, when N is an even number, there are N/2 set signals may be delayed. For each i=1, . . . , N/2, the delay circuit is configured to delay the $(2i-1)^{th}$ set signal CA(2i−1) to generate the $(2i-1)^{th}$ delay set signal CA(2i−1)-dly once the output voltage signal VOUT falls in $$(1 \pm k\ \%)\frac{1}{N}VIN, \ldots, \text{or } (1 \pm k\ \%)\frac{N-1}{N}VIN.$$

Meanwhile, the delay circuit 50 may be configured to keep the remaining N/2 set signals unchanged.

In an embodiment, when N is an even number, there are N/2 set signals may be delayed. For each i=1, . . . , N/2, the delay circuit is configured to delay the $(2i)^{th}$ set signal CA(2i) to generate the $(2i)^{th}$ delay set signal CA(2i)-dly once the output voltage signal VOUT falls in $$(1 \pm k\ \%)\frac{1}{N}VIN, \ldots, \text{or } (1 \pm k\ \%)\frac{N-1}{N}VIN.$$

Meanwhile, the delay circuit 50 may be configured to keep the remaining N/2 set signals unchanged.

In the exemplary embodiment of FIG. 13, for each i=1, 2, . . . , N, the COT controllers 30i may be configured to receive the output voltage signal VOUT, the input voltage signal VIN and the corresponding delay set signal CAi-dly. When the delay set signal CAi-dly is in the active state, the COT controller 30i may be configured to generate a corresponding control signal PWMi in compliance with the output voltage signal VOUT, the input voltage signal VIN and the delay set signal CAi-dly to control the corresponding pair of switching transistors Mia and Mib.

Figure 14:
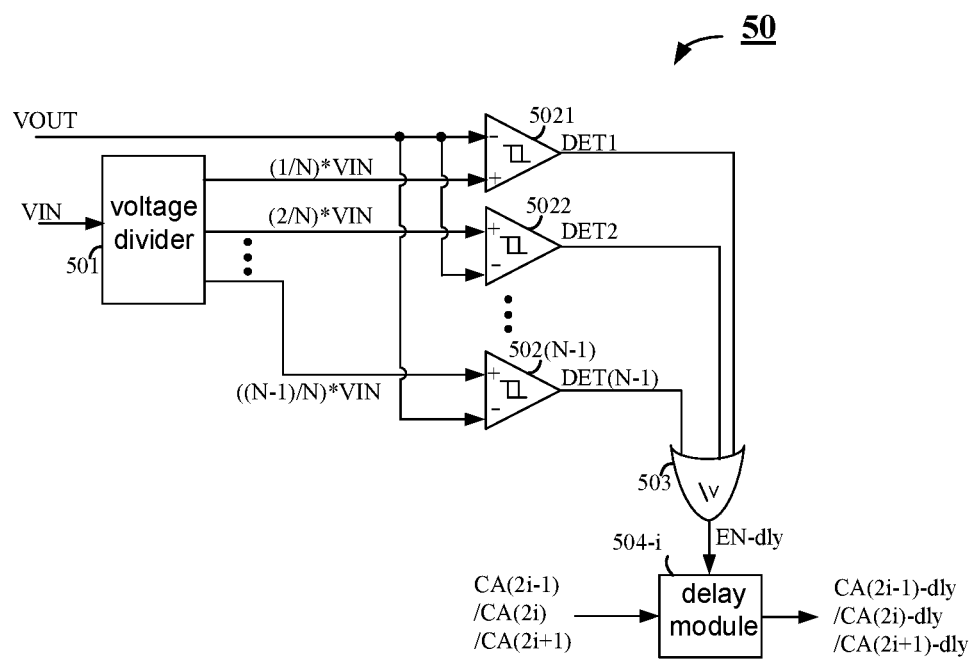
FIG. 14 schematically illustrates a delay circuit 50 of FIG. 13 in accordance with an embodiment of the present invention.

FIG. 14 schematically illustrates a delay circuit 50 of FIG. 13 in accordance with an embodiment of the present invention. In the exemplary embodiment of FIG. 14, the delay circuit 50 may comprise a voltage divider 501, N−1 hysteresis comparators (5021, . . . , 502(N−1)), an OR logic gate 503, and a plurality of delay modules, wherein the quantity of the delay modules is determined by the value of N. In an embodiment, when N is an even number, the quantity of the delay modules is N/2; when N is an odd number, the quantity of the delay modules is (N−1)/2.

The voltage divider 501 is configured to receive the input voltage signal VIN to generate a plurality of dividing voltage signals.

For each i=1, . . . , N−1, the hysteresis comparator 502i may be configured to receive the output voltage signal VOUT and the corresponding dividing voltage signal having a potential of $$\frac{i}{N}VIN,$$

and further configured to compare the output voltage signal VOUT with the dividing voltage signal having the potential of $$\frac{i}{N}VIN$$

to generate a corresponding determining signal DETi. In an embodiment, the hysteresis comparator 502$i$ predetermines the proportional coefficient k. When the output voltage signal VOUT is larger than $$(1 - k\%)\frac{i}{N}VIN$$

while smaller than $$(1 + k\%)\frac{i}{N}VIN,$$

the $i^{th}$ determining signal DETi is in an active state (e.g., the logic high state).

The OR logic gate 503 is configured to receive the N−1 determining signals (DET1, . . . , DET(N−1)), and configured to conduct a logic operation of the N−1 determining signals (DET1, . . . , DET(N−1)) to generate the delay enable signal EN-dly. In an embodiment, the delay enable signal EN-dly is in the active state (e.g., the logic high state) if any one of the N−1 determining signals (DET1, . . . , DET(N−1)) DETi is in the active state. Otherwise, the delay enable signal EN-dly is in the inactive state (e.g., the logic low state).

Each of the plurality of delay modules is configured to delay one corresponding set signal to generate a corresponding delay set signal when the delay enable signal EN-dly is in the active state.

In an embodiment, when N is an odd number, there are (N−1)/2 delay module.

For each i=1, . . . , (N−1)/2, the delay module 504-$i$ is configured to delay the $(2i-1)^{th}$ set signal CA(2i−1) to generate the $(2i-1)^{th}$ delay set signal CA(2i−1)-dly once the delay enable signal EN-dly is in the active state.

In an embodiment, when N is an odd number, there are (N−1)/2 delay module.

For each i=1, . . . , (N−1)/2, the delay module 504-$i$ is configured to delay the $(2i+1)^{th}$ set signal CA(2i+1) to generate the $(2i+1)^{th}$ delay set signal CA(2i+1)-dly once the delay enable signal EN-dly is in the active state.

In an embodiment, when N is an odd number, there are (N−1)/2 delay module.

For each i=1, . . . , (N−1)/2, the delay module 504-$i$ is configured to delay the $(2i)^{th}$ set signal CA(2i) to generate the $(2i)^{th}$ delay set signal CA(2i)-dly once the delay enable signal EN-dly is in the active state.

In an embodiment, when N is an even number, there are N/2 delay module.

For each i=1, . . . , N/2, the delay module 504-$i$ is configured to delay the $(2i-1)^{th}$ set signal CA(2i−1) to generate the $(2i-1)^{th}$ delay set signal CA(2i−1)-dly once the delay enable signal EN-dly is in the active state.

In an embodiment, when N is an even number, there are N/2 delay module. For each i=1, . . . , N/2, the delay module 504-$i$ is configured to delay the $(2i)^{th}$ set signal CA(2i) to generate the $(2i)^{th}$ delay set signal CA(2i)-dly once the delay enable signal EN-dly is in the active state.

Obviously, many modifications and variations of the present invention are possible in light of the above teachings. It is therefore to be understood that within the scope of the appended claims the invention may be practiced otherwise than as specifically described. It should be understood, of course, the foregoing disclosure relates only to a preferred embodiment (or embodiments) of the invention and that numerous modifications may be made therein without departing from the spirit and the scope of the invention as set forth in the appended claims. Various modifications are contemplated and they obviously will be resorted to by those skilled in the art without departing from the spirit and the scope of the invention as hereinafter defined by the appended claims as only a preferred embodiment(s) thereof has been disclosed.

What is claimed is:

1. A control circuit for controlling a multi-level buck converter having N pairs of switches serially connected between an input terminal and a logic ground, and wherein N is an integer equal to or greater than 2, the control circuit comprising:

a comparing circuit configured to receive a reference signal and a voltage feedback signal indicative of an output voltage signal of the multi-level buck converter, and further configured to compare the voltage feedback signal with the reference signal to generate a comparing signal;

a selecting circuit configured to receive the comparing signal, and further configured to generate N set signals based on the comparing signal; and a delay circuit configured to delay the N set signals to provide N delay set signals to control the N pairs of switches when the output voltage signal falls in $$(1 \pm k\%) \times \frac{1}{N}$$

of an input voltage signal of the multi-level buck converter, $$(1 \pm k\%) \times \frac{2}{N}$$

of the input voltage signal, . . . , or $$(1 \pm k\%) \times \frac{N-1}{N}$$

of the input voltage signal, wherein k is a proportional coefficient.

2. The control circuit of claim 1, wherein the delay circuit comprises:

a voltage divider configured to receive the input voltage signal to generate N−1 dividing voltage signals, wherein for each i=1, . . . , N−1, the $i^{th}$ dividing voltage signal of the N−1 dividing voltage signals is equal to $$\frac{i}{N}$$

of the input voltage signal;

N−1 hysteresis comparators configured to generate N−1 determining signals, wherein for each i=1, . . . , N−1, the $i^{th}$ hysteresis comparator is configured to receive the output voltage signal and the $i^{th}$ dividing voltage signal, and further configured to compare the output voltage signal with the $i^{th}$ dividing voltage signal to generate the $i^{th}$ determining signal of the N−1 determining signal;

an OR logic gate configured to receive the N−1 determining signals, and configured to conduct a logic OR operation of the N−1 determining signals to generate a delay enable signal; and a plurality of delay modules, wherein each of the plurality of delay modules is configured to receive the delay enable signal and one corresponding set signal of the N set signals, and further configured to generate one corresponding delay set signal based on the delay enable signal and the corresponding set signal.

3. The control circuit of claim 2, wherein when N is an odd number, the quantity of the delay modules is equal to (N−1)/2, and when N is an even number, the quantity of the delay modules is equal to N/2.

4. The control circuit of claim 1, wherein when N is an odd number, for each i=1, . . . , (N−1)/2, the delay circuit is configured to delay the $(2i-1)^{th}$ set signal of the N set signals to provide the $(2i-1)^{th}$ delay set signal of the N delay set signals.

5. The control circuit of claim 1, wherein when N is an odd number, for each i=1, . . . , (N−1)/2, the delay circuit is configured to delay the $(2i+1)^{th}$ set signal of the N set signals to provide the $(2i+1)^{th}$ delay set signal of the N delay set signals.

6. The control circuit of claim 1, wherein when N is an odd number, for each i=1, . . . , (N−1)/2, the delay circuit is configured to delay the $(2i)^{th}$ set signal of the N set signals to provide the $(2i)^{th}$ delay set signal of the N delay set signals.

7. The control circuit of claim 1, wherein when N is an even number, for each i=1, . . . , N/2, the delay circuit is configured to delay the $(2i-1)^{th}$ set signal of the N set signals to provide the $(2i-1)^{th}$ delay set signal of the N delay set signals.

8. The control circuit of claim 1, wherein when N is an even number, for each i=1, . . . , N/2, the delay circuit is configured to delay the $(2i)^{th}$ set signal of the N set signals to provide the $(2i)^{th}$ delay set signal of the N delay set signals.

9. The control circuit of claim 1, wherein the proportional coefficient k is smaller than 10.

10. The control circuit of claim 1, further comprising:
N COT controllers, wherein for each i=1, 2, . . . , N, the $i^{th}$ COT controller is configured to receive the $i^{th}$ delay set signal of the N delay set signals, the output voltage signal and the input voltage signal, and based on the $i^{th}$ delay set signal, the output voltage signal and the input voltage signal, the $i^{th}$ COT controller is further configured to generate an $i^{th}$ control signal to control the $i^{th}$ pair of switches of the N pairs of switches to perform a complementary on and off switching.

11. A multi-level buck converter, comprising:
N pairs of switches serially connected between an input terminal and a logic ground, wherein N is an integer equal to or greater than 2;

a comparing circuit configured to receive a reference signal and a voltage feedback signal indicative of an output voltage signal of the multi-level buck converter, and further configured to compare the voltage feedback signal with the reference signal to generate a comparing signal;

a selecting circuit configured to receive the comparing signal, and further configured to generate N set signals based on the comparing signal; and a delay circuit configured to delay the N set signals to provide N delay set signals to control the N pairs of switches when the output voltage signal falls in $$(1 \pm k\%) \times \frac{1}{N}$$

of an input voltage signal of the multi-level buck converter, $$(1 \pm k\%) \times \frac{2}{N}$$

of the input voltage signal, . . . , or $$(1 \pm k\%) \times \frac{N-1}{N}$$

of the input voltage signal, wherein k is a proportional coefficient.

12. The multi-level buck converter of claim 11, wherein the delay circuit comprises:

a voltage divider configured to receive the input voltage signal to generate N−1 dividing voltage signals, wherein for each i=1, . . . , N−1, the $i^{th}$ dividing voltage signal of the N−1 dividing voltage signals is equal to $$\frac{i}{N}$$

of the input voltage signal;

N−1 hysteresis comparators configured to generate N−1 determining signals, wherein for each i=1, . . . , N−1, the $i^{th}$ hysteresis comparator is configured to receive the output voltage signal and the $i^{th}$ dividing voltage signal, and further configured to compare the output voltage signal with the $i^{th}$ dividing voltage signal to generate the $i^{th}$ determining signal of the N−1 determining signal;

an OR logic gate configured to receive the N−1 determining signals, and configured to conduct a logic OR operation of the N−1 determining signals to generate a delay enable signal; and a plurality of delay modules, wherein each of the plurality of delay modules is configured to receive the delay enable signal and one corresponding set signal of the N set signals, and further configured to generate one corresponding delay set signal based on the delay enable signal and the corresponding set signal.

13. The multi-level buck converter of claim 12, wherein when N is an odd number, the quantity of the delay modules is equal to (N−1)/2, when N is an even number, the quantity of the delay modules is equal to N/2.

14. The multi-level buck converter of claim 11, wherein when N is an odd number, for each i=1, . . . , (N−1)/2, the delay circuit is configured to delay the $(2i-1)^{th}$ set signal of the N set signals to provide the $(2i-1)^{th}$ delay set signal of the N delay set signals.

15. The multi-level buck converter of claim 11, wherein when N is an odd number, for each i=1, ..., (N−1)/2, the delay circuit is configured to delay the $(2i+1)^{th}$ set signal of the N set signals to provide the $(2i+1)^{th}$ delay set signal of the N delay set signals.

16. The multi-level buck converter of claim 11, wherein when N is an odd number, for each i=1, ..., (N−1)/2, the delay circuit is configured to delay the $(2i)^{th}$ set signal of the N set signals to provide the $(2i)^{th}$ delay set signal of the N delay set signals.

17. The multi-level buck converter of claim 11, wherein when N is an even number, for each i=1, ..., N/2, the delay circuit is configured to delay the $(2i-1)^{th}$ set signal of the N set signals to provide the $(2i-1)^{th}$ delay set signal of the N delay set signals.

18. The multi-level buck converter of claim 11, wherein when N is an even number, for each i=1, ..., N/2, the delay circuit is configured to delay the $(2i)^{th}$ set signal of the N set signals to provide the $(2i)^{th}$ delay set signal of the N delay set signals.

19. A control method for controlling a multi-level buck converter having N pairs of switches serially connected between an input terminal and a logic ground, and wherein N is an integer equal to or greater than 2, the control method comprising:
generating a comparing signal based on a comparison between a reference signal and a voltage feedback signal indicative of an output voltage signal of the multi-level buck converter;
generating N set signals based on the comparing signal; and
providing N delay set signals to control the N pairs of switches by delaying the N set signals when the output voltage signal falls in $$(1 \pm k\%) \times \frac{1}{N}$$

of an input voltage signal of the multi-level buck converter, $$(1 \pm k\%) \times \frac{2}{N}$$

of the input voltage signal, ..., or $$(1 \pm k\%) \times \frac{N-1}{N}$$

of the input voltage signal, wherein k is a proportional coefficient.

20. The control method of claim 19, wherein the step of providing N delay set signals comprises:
generating N−1 dividing voltage signals based on the input voltage signal, wherein for each i=1, ..., N−1, the $i^{th}$ dividing voltage signal of the N−1 dividing voltage signals is equal to $$\frac{i}{N}$$

of the input voltage signal;
generating N−1 determining signals based on the N−1 dividing voltage signals, wherein for each i=1, ..., N−1, the $i^{th}$ determining signal is generated based on a comparison between the $i^{th}$ dividing voltage signal and the output voltage signal;
generating a delay enable signal based on the N−1 determining signals; and
providing the N delay set signals by delaying the N set signals when the delay enable signal is in an active state.

* * * * *